No. 871,621. PATENTED NOV. 19, 1907.
J. N. PARKS.
BACK PEDALING COASTER BRAKE.
APPLICATION FILED FEB. 23, 1905.

WITNESSES:
Clarence W. Carroll.
L. Thow.

INVENTOR:
John N. Parks
by Osgood & Davis
his attys.

UNITED STATES PATENT OFFICE.

JOHN N. PARKS, OF ROCHESTER, NEW YORK, ASSIGNOR TO DAVID L. WHITTIER, OF ELMIRA, NEW YORK.

BACK-PEDALING COASTER-BRAKE.

No. 871,621.  Specification of Letters Patent.  Patented Nov. 19, 1907.

Application filed February 23, 1905. Serial No. 247,042.

*To all whom it may concern:*

Be it known that I, JOHN N. PARKS, a citizen of the United States, and resident of Rochester, in the county of Monroe and State of New York, have invented certain new and useful Improvements in Back-Pedaling Coaster-Brakes, of which the following is a specification.

This invention relates to back pedaling coaster brakes, and its object is to provide an effective device having few parts and easy to assemble.

Figure 1:
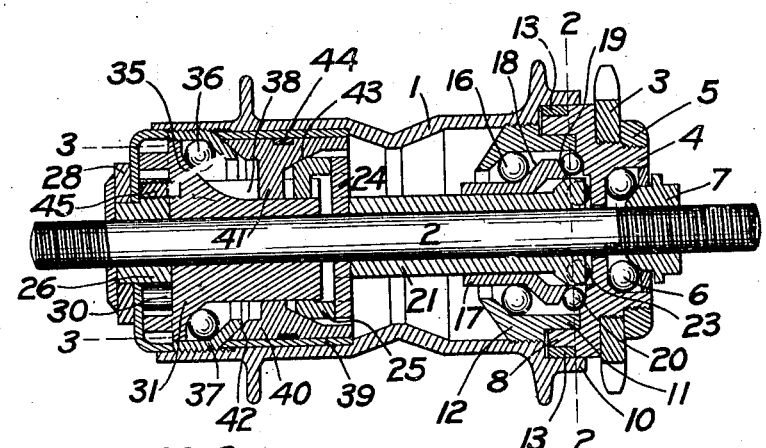
Figure 2:
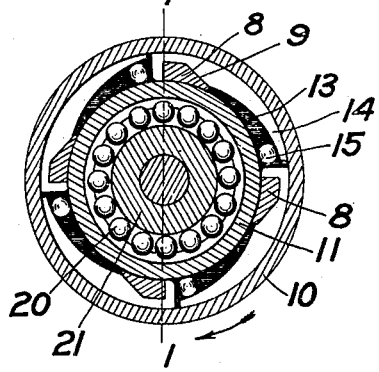
Figure 3:
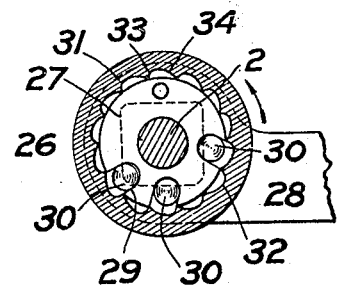
Figure 4:
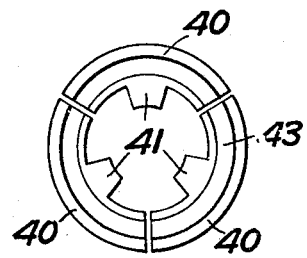
Figures 5, 6:
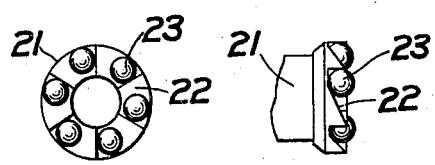

In the drawings:—Figure 1 is a central longitudinal section of a device embodying this invention, on the line 1—1 of Fig. 2; Fig. 2 is a cross-section on the line 2—2 of Fig. 1; Fig. 3 is a cross-section on the line 3—3 of Fig. 1; Fig. 4 is an end elevation of the brake shoes; Fig. 5 is an end elevation of a part of the brake actuator; and Fig. 6 is a side elevation of the same parts shown in Fig. 5.

This device is particularly intended for application to bicycles, and is shown in a form suitable for that purpose.

In the drawings, 1 is the hub; 2 is the usual axle that is attached to the bicycle frame in any suitable manner. At one end of the hub is the sprocket wheel 3 fixed upon a block 4, and held thereon in any suitable manner such as by the lock nut 5. The block 4 forms a cup, for a series of bearing balls 6 which run upon a cone 7 on the axle 2. The block 4 has also another ball bearing, as will be described. On the block 4 are a series of lugs 8, Fig. 2, having inclined faces 9. These lugs extend within the outer edge 10 of the hub 1 and between said edge and a ring 11 fastened to the hub and forming part of a ball cup 12. The lugs 8 fit into recesses in clutch shoes 13 which shoes have inclined faces 14, under which run rollers 15. These rollers run upon the ring 11. As will be seen from Fig. 2, if the sprocket wheel 3 and block 4, and therefore the lugs 8, are driven forwardly, in the direction shown by the arrow, the clutch shoes 13 will be moved in the same direction, and the rollers 15 will move in the opposite direction because they roll upon the ring 11; and this movement of the rollers 15 will move the clutch blocks 13 along the inclined faces 9 and will force said clutch blocks outwardly against the rim 10 of the hub until a sufficient pressure and friction have been created to drive the hub forwardly with the sprocket 3.

The ball cup 12 holds a series of balls 16 between it and a double cone consisting of a sleeve 17 having the cone 18 for the balls 16, and the cone 19 for the row of balls 20, which last series of balls runs against the back of the block 4, so that said block 4 runs upon the two series of balls 6 and 20, and any longitudinal pressure of said block against the balls 20 is resisted through the sleeve 17 and row of balls 16 by the cup 12 that is firmly fastened in the hub 1.

Within the sleeve 17 is a sleeve 21 directly surrounding the axle 2, and having upon its end the series of inclined faces 22, for each of which there is a ball 23 adapted to make contact with the back of the block 4. The faces 22 are inclined in such direction that when the sprocket wheel 3 and block 4 are rotated backwardly, balls 23 will be rolled up the inclines 22, and so the sleeve 21 will be shifted longitudinally along the axle 2. The sleeve 21 is connected with the braking mechanism so as to be held non-rotary.

Upon the axle, at the opposite end of the hub from that carrying the sprocket wheel 3, is a block 26 having a squared portion 27 to hold a brake arm 28, which latter is fastened to the frame of the bicycle in any usual manner. The block 26 has one or more sockets 29 extending from its periphery toward its center, and each adapted to hold a roller 30. In the form of the device shown there are three of these sockets, and they are all on the lower side of said block 26 so that the rollers 30 tend to fall out from the bottom of the sockets. Upon the axle 2 is another block 31 which is provided with a series of sockets 32, each having an abrupt face 33 and a longer inclined face 34, so that when the block 31 turns in the direction of the arrow in Fig. 3, the rollers will be lifted from the sockets 32 into the sockets 29 thus unclutching the block 26 from the block 31, but if the block 31 revolves in a direction opposite to that of the arrow in Fig. 3 the rollers 30 will be caught against the abrupt faces 33 and the block 31 will be brought to rest. The block 31 is provided with cone faces 35 for a series of balls 36, which run also in a cup 37 fastened in the hub 1. The block 31 has also one or more slots 38 parallel to its axis. In the present construction there are three such slots. Within the hub, and adjacent to a friction ring 39 permanently fixed in said hub, are a series of brake shoes 40, of which there are three in the present form of the device. Each brake shoe has a tongue or lug 41, see Fig. 4, adapted to fit in one of the slots 38 in the block 31, and each brake shoe has an inclined face 42 adapted to fit against the inclined face formed by the back of the ball cup 37. The brake blocks 40 have also inclined faces 43 adapted to engage correspondingly inclined faces upon a part 24 on the end of the sleeve 21. The part 24 carries one or more lugs 25 fitting in one or more of the slots 38 of the block 31, and thus the brake actuating sleeve 21 is made non-rotary. The brake blocks 40 are normally contracted or pressed together so as to be free from the brake surface on the hub by means of a spring 44 set in a groove in the outer surface of the said brake blocks.

The operation of the device is as follows:— In forward pedaling the sprocket 3 and block 4 move in the direction shown by the arrow in Fig. 2. In starting, the hub and therefore the cup 12 and ring 11 are stationary, and the lugs 8 will be moved in the direction of the arrow in said figure, also causing the rollers 15 to roll along on the ring 11 and thereby the clutch blocks 13 will be forced outward against the hub, thus clutching the sprocket wheel to the hub for forward driving. If the bicycle is running forward, on stopping the sprocket wheel and holding it stationary, the hub will continue to rotate in the direction shown by the arrow in Fig. 2, but the block 4 and lugs 8 will be held stationary, and inasmuch as the ring 11 revolves with the hub the clutch blocks will be moved in the direction of the arrow down the inclined faces 9 and thus relieve the pressure at that end, while at the same time the revolution of the ring 11 will move the rollers 15 until they stop against the ends of the clutch blocks 13, thus releasing the pressure of said clutch blocks against the hub and permitting the hub to run on and to revolve freely, although the sprocket wheel is held stationary. In this position the sleeve 21 and block 31 are also held stationary since they are coupled together through the lugs 25. On turning the sprocket wheel backward from the position just mentioned, the balls 23 will be caused to roll up the inclined faces 22 by the friction on the back of the block 4, and thus the sleeve 21 will be shifted longitudinally along the axle 2 and the part 24 will slide along the inclined faces 43 of the brake blocks 40, forcing them apart and against the friction surface on the hub, and inasmuch as said brake blocks are connected with the block 31 by the lugs 41, and said block 31 is held stationary by the coupling of the block 31 and the block 26 through the rollers 30, a strong braking friction will occur between the brake blocks and the interior of the hub. This effect is augmented by the fact that the inclined faces 42 of the brake blocks 40 are expanded by movement on the back of the ball cup 37. As soon as backward pressure upon the sprocket wheel 3 is released, the spring 44 breaks the contact of the brake blocks against the interior of the hub and the braking action ceases.

In the use of many back pedaling brakes it is impossible to trundle a bicycle backward, because an attempt to do so immediately sets the brake. In the present device, however, the clutch between the block 31 and the block 26 permits this backward trundling, so that even if the brake is set the block 31 may revolve in the direction of the arrow in Fig. 3 with reference to the block 26. Where the ability to trundle the wheel backward is not desired, the blocks 31 and 26 may be permanently fastened together in any suitable manner, such for instance, as by a set screw 45.

What I claim is:—

In a back pedaling coaster brake, the combination of a hub, a block adapted to be held non-rotary and having longitudinal slots therein, one or more brake blocks having tongues resting in said slots and having inclined inner faces, a brake actuator adapted to engage said inclined faces at one end to expand said one or more brake blocks against the hub for braking and having also a series of inclined faces on the other end and parts movable along said inclined faces, a driver adapted on reverse rotation thereof to engage said movable parts and to move them along said inclined faces on the brake actuator to move it longitudinally and without rotation, and thereby to expand said brake blocks against the hub upon back pedaling, and an automatic clutch between the driver and the hub for forward driving.

JOHN N. PARKS.

Witnesses:
D. GURNEE,
CLARENCE W. CARROLL.